Sept. 22, 1925.
O. H. COOLIDGE
1,554,412
WHEEL PULLER
Original Filed July 10, 1922
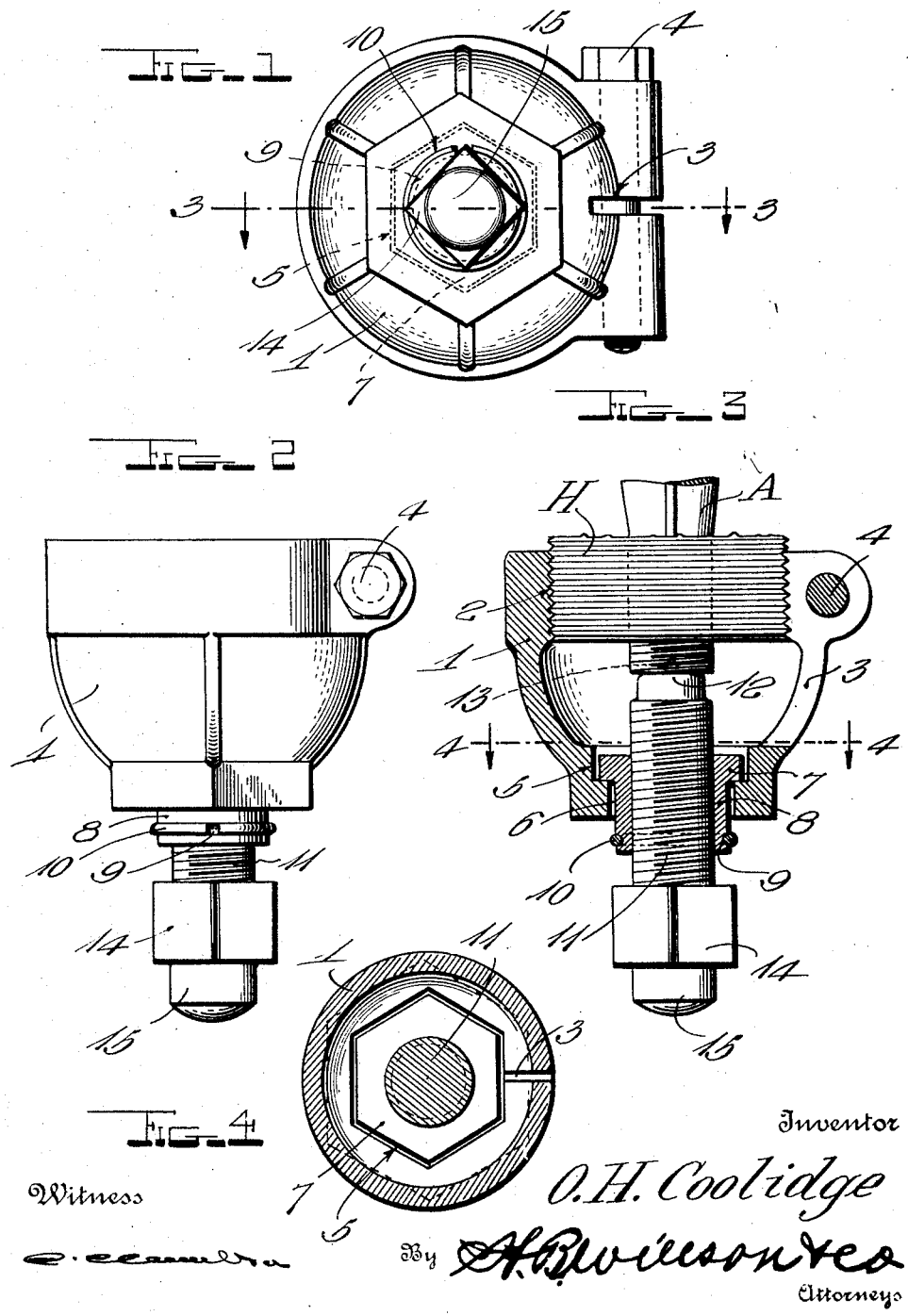
Inventor
O. H. Coolidge
By H. B. Williston & Co.
Attorneys
Witness Patented Sept. 22, 1925.

1,554,412

UNITED STATES PATENT OFFICE.

OMERON H. COOLIDGE, OF RUTLAND, VERMONT.

WHEEL PULLER.

Application filed July 10, 1922, Serial No. 573,845. Renewed April 13, 1925.

*To all whom it may concern:*

Be it known that I, OMERON H. COOLIDGE, a citizen of the United States, residing at Rutland, in the county of Rutland and State of Vermont, have invented certain new and useful Improvements in Wheel Pullers; and I do declare the following to be a full, clear, and exact description of the invention, such as will enable others, skilled in the art to which it appertains, to make and use the same.

My invention relates to improvements in wheel pullers and more particularly to those which are designed primarily for use in removing the back wheels of automobiles from the rear axle sections. I am aware that numerous devices have been patented for this purpose, but the object of my invention is to provide a simplified and less expensive device, yet one which will be highly efficient and may be used upon different makes of automobiles, simply by making a slight interchange of parts.

With the foregoing in view, the invention resides in the novel structure hereinafter described and claimed, the descriptive matter being supplemented by the accompanying drawings.

Figure 1 is an end elevation of a wheel puller constructed in accordance with my invention.

Figure 2 is a side elevation.

Figure 3 is a longitudinal sectional view as indicated by line 3—3 of Fig. 1.

Figure 4 is a transverse section on line 4—4 of Fig. 3.

In the drawings above briefly described, the numeral 1 designates a cap which is preferably of cast construction, although this is not essential, the open end of said cap being internally threaded as at 2 so that it may be threaded upon the hub of an automobile wheel. A split 3 is formed in the cap 1 and opens through its open end, and a clamping screw 4 is provided for contracting the cap around the hub, so as to take strain from the threads during the pulling operation.

The closed end of the cap 1 is formed with an internal polygonal socket 5 and with a preferably circular opening 6 which leads through said end from said socket. A floating polygonal nut 7 is non-rotatably but loosely received in the socket 5 and is provided with an integral sleeve 8 which extends outwardly through the opening 6, suitable provision being made whereby this nut may be removed whenever desired. In the preferred form of construction, the outer end of the sleeve 8 is formed with a peripheral groove 9 and a split ring 10 is snapped into said groove as shown. While this ring normally prevents removal of the nut and sleeve, detachment of said ring will permit said nut and sleeve to be detached from a cap 1 of one size or any size so that one of another size may be substituted, for use upon a different make of automobile.

A screw 11 is threaded through the sleeve 8 and nut 7 and is provided with a flat inner end 12 for contact with the end of an automobile axle, said end of the screw being preferably provided with a centering projection 13 for reception in the usual center socket at the end of the axle. The portion 13 is merely to center the screw 11 and all thrust is exerted by the flat end of the screw resting against the similar end of the axle. Outside of the cap 1, the screw 11 is provided with a polygonal enlargement 14 to be engaged by a wrench in turning the screw, but said enlargement is spaced inwardly from the outer end 15 of said screw so that the latter may be struck with a hammer to jar the wheel hub loose from the axle after tightening of the screw, and it will be seen that the screw may be repeatedly struck by means of a hammer or the like, without danger of mutilating the enlargement 14 and interfering with proper application of a wrench thereto.

In operation, the cap 1 is threaded upon the hub H as shown in Fig. 3 and the screw 11 is threaded inwardly against the end of the axle A, whereupon use of a wrench from the enlargement 15 to forcibly turn said screw will usually pull the wheel from the axle. However, if the hub has become tightly wedged upon said axle, so that it cannot be easily removed, the outer end 15 of the screw may be struck with a hammer and the hub thus jarred loose from the axle. By striking the device in this manner, no injury whatever will result to the threads on the screw 11 or to the threads by means of which the cap is connected with the hub, since the nut 7 and sleeve 8 merely move a trifle in the socket 5 and opening 6 respectively.

Attention is directed to the fact that the nut 7 and sleeve 8 may readily be removed from one cap 1 and positioned within another cap of a different size, so that by employing a plurality of caps of different diameters, the device may be made to operate upon numerous kinds of automobiles. Furthermore, attention is particularly directed to the fact that the nut and sleeve are loosely connected with the cap, this being of great advantage not only when striking the screw end 15 with a hammer, but it permits slight lateral shifting of the screw for proper engagement with the axle if the latter has become sprung with respect to the threaded part of the hub.

Since excellent results have been obtained from the exact details disclosed and in view of the fact that they greatly simplify devices of this character, these details are preferably followed, but within the scope of the invention as claimed, minor changes may of course be made.

I claim:

1. A wheel puller comprising an internally threaded cap adapted to be threaded upon a wheel hub, the closed end of said cap being provided with an internal polygonal socket and with an opening extending from this socket to the outer extremity of said end, a polygonal nut nonrotatably but loosely received in said polygonal socket and having an integral sleeve passing loosely through and beyond said opening, means on the outer end of said sleeve for loosely retaining the same in said opening, and an axle-engaging screw threaded through said sleeve and nut.

2. A wheel puller comprising an internally threaded cap adapted to be threaded upon a wheel hub, the closed end of said cap being provided with an internal polygonal socket and with an opening extending from this socket to the outer extremity of said end, a polygonal nut non-rotatably but loosely received in said polygonal socket and having an integral sleeve passing loosely through and beyond said opening, the outer end of said sleeve being provided with a peripheral groove spaced outwardly from the cap, a removable spring ring snapped into said groove and adapted to engage the end of the cap to loosely retain the sleeve and nut in place, and an axle-engaging screw threaded through said sleeve and nut.

In testimony whereof I have hereunto set my hand.

OMERON H. COOLIDGE.